Patented July 9, 1935

2,007,693

UNITED STATES PATENT OFFICE 2,007,693

CHEMICAL PROCESS FOR THE PRODUCTION OF HUSKED GRAIN, BOTH GERMINATED AND UNGERMINATED

Rudolf Rüter, Cologne-Deutz, and Kurt Seidel, Berlin-Zehlendorf, Germany, assignors to Novopan Studiengesellschaft zur Herstellung besseren und billigeren Brotes m. b. H., Frankfort-on-the-Main, Germany, a corporation of Germany No Drawing. Application September 30, 1933, Serial No. 691,694. In Germany July 2, 1929

20 Claims. (Cl. 83—28)

This invention relates to a chemical process for the production of husked germinated and ungerminated grain employing chemicals which strongly dissociate the ions of water such as acids and lyes.

The problem of husking grain chemically consists not only in obtaining a desirable husked product, but also in carrying out the husking, free from objection, from a technical point of view, in an economically correct and profitable manner.

Heretofore, grain has been treated with dilute lyes or acids for the purpose of producing a husking action and attempts have been made to remove the husk with the help of brushing machines and the like. In these known methods or processes only a loosening of the husk was effected and vigorous subsequent treatment with brushing machines and the like was required.

Attempts have also been made to husk grain with highly concentrated lyes or acids. Apart from the fact that it is impossible to avoid damaging the germ and the grain by the highly concentrated lyes or acids, such a process is not profitable, because too large a quantity of chemicals is required. Again the losses in grain substance are too great. Treatment with concentrated sulphuric acid for example alters the ratio or conditions of acidity in the interior of the grain in such a way that a high grade flour cannot be obtained at all, and the minute traces of husk left in the central furrow in the grain of corn are coloured black which causes the flour produced to be disfigured with black specks.

For the reason above given the chemical methods for husking grain have consequently not been a practical success.

A chemical grain husking process to be practically successful must meet the following requirements:

1. The husking must be carried out rapidly with comparatively small quantities of chemicals, without the assistance of mechanical auxiliary measures to any great extent and without any appreciable quantities of chemicals penetrating into the interior of the grain.

2. Losses in grain substance must be avoided as much as possible during the husking process.

3. The chemicals used must if possible be capable of being regenerated in a convenient manner after they have been used or rendered innocuous as regards their ability to react chemically.

For the reasons given above only dilute lyes and acids can be used for chemical grain husking process, but to be useful, concentrations above 2% must be used.

In the chemical husking of grain three variables occur, which are; concentration of the chemicals, temperature, and the length of time during which they are allowed to act on the grain.

Now it has been found, according to the present invention, that by the correct combination of concentration, temperature and the length of time during which the chemicals are allowed to act on the grain, not only can a loosening of the husk be obtained but also a dissolving up or a dissolving off thereof without any appreciable quantities of the chemicals penetrating into the interior of the grain of corn notwithstanding this dissolving up or dissolving off of husks.

The conditions are such that when acids are used all the other constituents of the husk with the exception of the husk of the seed are dissolved off or dissolved up. Grain husked or stripped down to the husk of the seed is obtained.

When lyes are used dissolving off or dissolving up of the husk of the seed is effected in addition to the dissolving off and dissolving up of many other constituents of the husk, whereby the fruit husk which lies over the husk of the seed and which is not completely dissolved up as such is rendered easily detachable. Treatment with lyes produces consequently grain which is husked including the husk of the seed.

The essential novel feature of the new process is that for the first time the chemical husking of grain is extended to a dissolving up or dissolving off of husks and notwithstanding this the penetration of the chemicals into the interior of the grain of corn has been avoided in a surprising manner.

The suitable concentration, temperature and length of time during which the chemicals are allowed to act on the particular grain to be treated is ascertained by experiment. It is, as a matter of fact, possible to determine when the husks are dissolved up and dissolved off in the sense above indicated by the chemicals and when the penetration of deleterious quantities of chemicals into the interior of the grain of corn takes place. For the latter reaction there is a very sharp indicator available in the grain, due to the fact that coloration of the albumen at the germ end of the grain or corn takes place when it is brought into contact with acids or lyes. Chemicals always pass through the husks of the seed at the germ end first. If for example acid penetrates at the germ end in wheat the contents thereof become black, if an acid penetrates into rye, the contents become of a reddish colour and if lye penetrates wheat a green coloration is produced and so on. A characteristic coloration is always produced. By means of preliminary experiments the length of time it takes to produce the first coloration at the germ end can easily be ascertained for a given concentration of the chemicals and a given length of time of action. The actual length of time during which the chemicals are allowed to act must then be made slightly shorter than that determined by the preliminary experiment.

It should be pointed out that the solution of the cellulose takes place uniformly over the whole of the surface of the grain of corn and only when the solution of the cellulose is actually completed does the gradual penetration of the chemicals into the grain of corn at the germ end take place.

*Example 1 of how the invention may be carried out*

If wheat be treated with sulphuric acid (of a strength of about 30%) at a temperature of about 60° C. and for a period of about 8 minutes, it will be seen how the constituents of the husk dissolve up or dissolve off down to the husk of the seed. After washing off the acid a wheat results which is husked down to the husk of the seed which is still left.

*Example 2*

If wheat be treated with a solution of caustic soda (of a strength of about 30%) at a temperature of about 60° C. and for a period of about 15 minutes, the following result will be obtained:

It will be clearly seen how the operations of dissolving up the constituents of the husk take place. The fruit husk is however left adhering to the grain of corn but its texture is radically changed and much loosened. Something different however has happened. In contradistinction to the action produced by the treatment with acid the husk of the seed has dissolved off under the fruit husk because when the grain which has been treated has been washed a grain is obtained which is also freed from the husk of the seed. After being husked the grain may be conveniently freed from the solvent by treatment in centrifuges or, the like, then washed (neutralized) and if necessary it may also be polished. As washing solutions very dilute lyes may, if required, be used when the husk has been removed by acid and when lyes have been used for the removal of the husk very dilute acids may be employed, in admixture also with salts such as common salt.

As acids which are suitable for the process sulphuric, nitric or phosphoric acids may be substantially used at a concentration of about 20% to 50% and as suitable lyes soda or potash lyes of a concentration of about 10% to 50% may be employed. Mixtures also of acids or mixtures of soda and potash lyes are suitable.

The suitable interval of temperature is about 50° to 80° C.

The more rapidly the process can be carried out the smaller the quantities of chemical used and the lower the temperature is the more profitable will the process be.

It has been found that the velocity with which the solvents act can be increased by the addition of chemicals of a non-acid or alkaline nature. In this way it is possible while retaining the usual concentration of acid or lye, and the usual temperature at which treatment is carried out, to reduce the time of treatment or while retaining the time of treatment to reduce the concentration of acid or lye and the temperature respectively.

The following have been found to answer well as such additions:

Halogen salts such as zinc chloride, iron chloride, and sodium chloride or bromide.

Salts of organic acids or similar compounds such as sodium acetate and ethylacetate for example.

Oxidizing agents such as hydrogen peroxide, potassium chlorate, potassium perchlorate, chloride of lime, potassium permanganate, potassium bichromate etc.

Reducing agents such as sodium sulphite.

The following are very effective:

Alkali nitrates or nitrites, or also salts of ortho- and pyrophosphoric acids.

In order to accelerate the reaction it is convenient not to exceed 3% of the added substances; in many cases $\tfrac{1}{10}$% to $\tfrac{1}{2}$% is sufficient.

*Example 3*

If wheat be treated with sulphuric acid (of a strength of about 30%) to which 0.1% of nitric acid has been added, at a temperature of about 60° C. and for a period of about 5 minutes, the same result is obtained as in Example 1.

It has frequently been found convenient to moisten the grain first with those chemicals which accelerate the reaction and then allow them to pass through the bath of acid or lye.

Treatment may be repeated with the same quantity of dehusking agent until the solvent is exhausted. If need be the process may also be carried out on the moistening principle.

It has been found to be of advantage to treat the same quantities of grain in succession with acid and lye or in the reverse order as in such cases an attack on the constituents of the husk which are soluble in acid as well as those which are soluble in alkalies takes place.

In order to facilitate the access of the really solvent acids or lyes to those parts of the husk which are to be dissolved up or dissolved off it is of advantage to treat the grain in addition to dilute acids or lyes, also with such chemicals as will dissolve or loosen the fatty or waxy substances or the like which chemicals may be chloroform, ether, acetone, trichlorethylene, benzol, alcohol and the like.

The process may be carried out in two stages, the treatment with those chemicals which dissolve the fatty and/or waxy substances and the like being carried out first and the dissolution proper of the husk then effected with the dilute acids or lyes.

Both processes may also be combined into one stage of the process. Thus such chemicals for removing the fatty and waxy substances and the like may be used which will mix or emulsify with the dilute acids or lyes, which mix with each other or form compounds with each other.

For example solutions which have been found to answer well are solutions of sodium or potassium hydroxide in alcohol, alcoholic solutions of sulphuric acid, mixtures of acetone and acid and the like or compounds of the following composition for example alkali alcoholates, diluted with ether, alcoholic peroxides such as sodium peroxide and the like.

Amines, chloramines, phenols, chlorophenols, acid chlorides, acid anhydrides, sulphonic acids, nitrosyl sulphuric acid, nitrosyl chloride, chloride dioxide and the like also are suitable for the treatment of grain in the sense of the present invention.

The chemicals which remove the fatty and waxy substances and the like may after being used be used over again after being subjected to well known process of recovery.

It should be mentioned that the action of the chemicals is still further increased by raising the temperature.

The use of those chemicals which loosen the fatty and waxy substances and the like has not only been found to be of advantage prior to or during the operation of solution proper with acids or lyes but also after it, in order to obtain perfectly white grains of corn.

In the dehusking of grain carried out in the manner above described a fairly considerable loss of grain substance takes place amounting to about 5% and more, because the husks pass over as the result of the operations into the lye or acid and in such a fine state of colloidal or colloidal-like subdivision that their recovery from the spent dehusking agent by centrifuging or filtration is not possible directly. Furthermore water-soluble constituents of the bran layer, namely pentosanes, carbohydrates, albumenoids and salts pass over into the dehusking agent.

A loss of grain substance of about 5% and more may jeopardize the profitableness of the present grain dehusking process.

It has now been found that a loosening of the husks in the present invention may be obtained and the complete decomposition colloidally of the constituents of the husks dissolved up or dissolved off yet prevented and a certain coherent reticular structure of the particles of husk retained, if pure dilute acids or lyes be not used but salts, which may conveniently be neutral salts such as sodium chloride, calcium chloride, sodium sulphate and the like be added thereto. By doing this the complete colloidal subdivision when dehusking with lyes is prevented and the constituents of the husks can be recovered by centrifuging filtration and the like from the dehusking agent after the same is exhausted and heavily loaded with the constituents of the husks, and utilized in the form of bran.

It has also been found that owing to the comparatively high salt content the above mentioned soluble constituents of the husks and the bran layer do not pass over into the dehusking agent, and that furthermore the bran remains poor in water when salt solutions are used. It may be that osmotic reactions take place when salt solutions are used.

Thus for example an addition of common salt to the dehusking lye or acid of about 10% to 20% has been found to be suitable. Still higher and lower concentrations may however also be employed.

In the dehusking of grain by means of acid in particular it is possible by heavily diluting the spent dehusking agent with water to produce a separation of the dissolved constituents of the husks and effect recovery of them.

The surprising fact has been observed that the grain when dehusked by the process described in the present application does not lose its germinating power, but on the contrary remains capable of germination and in other words capable of being malted.

A malt free from glume and husk with all its well-known advantages may be obtained if grain dehusked by chemical means be malted—that is to say, be caused to germinate in the well-known way.

In the dehusking of grain large quantities thereof have to be treated and accordingly the quantity of acids or lyes used is also great, even when fresh charges of grain are treated several times with the same quantity of the agent used for treatment. The procedure adopted according to this invention is therefore such that a charge of acid is spent by the addition of the grain to be dehusked, after which a charge of lye is used up in the same way, and the waste acids and lyes then subjected to double decomposition with each other.

Each time therefore after using up two charges of the agent used for treatment there will be a quantity of acid approximately equivalent to the quantity of lye used. The waste lye and waste acid are then combined in neutralizing quantities so that a neutral salt solution is produced which can be allowed to run away without damage to the surrounding neighbourhood or the salt formed obtained in an easy manner by concentration and subsequent crystallization.

If for example sulphuric acid and potash lye be used as the medium for treatment potassium sulphate, which is of value as a fertilizer, will be formed after neutralization and when phosphoric acid and potash lyes are used valuable phosphates can be obtained for use as fertilizers etc.

By using the acids and lyes in the manner described the process according to the present invention is profitable in all respects and can be carried out technically because the process of neutralization which serves to render the chemicals innocuous takes place instantly on the spot without loss of time and can easily be carried out by anybody.

What we claim is—

1. A process for chemically dehusking grain, comprising subjecting the grain to the action of dilute solutions of chemicals capable of strongly dissociating the ions of water, at superatmospheric temperature for a time sufficient to effect dissolving up or dissolving off of husks, and terminating the action of the solution on the grain just before permanent coloration of the contents of the grain ensues at the germ end.

2. A process for chemically dehusking grain, comprising subjecting the grain to the action of dilute solutions of chemicals capable of dissociating the ions of water and of catalysts for accelerating the action of the chemicals in dissolving up or dissolving off of husks, at superatmospheric temperature for a time sufficient to effect dissolving up or dissolving off of husks, and terminating the action of the solution on the grain just before permanent coloration of the contents of the grain ensues at the germ end.

3. A process for chemically dehusking grain, comprising first treating the grain with a solvent for dissolving and loosening fatty and waxy substances to facilitate access of the dehusking chemical, then subjecting the grain to the action of dilute solutions of chemicals capable of strongly dissociating the ions of water, at superatmospheric temperature for a time sufficient to effect dissolving up or dissolving off of husks, and terminating the action of the solution on the grain just before permanent coloration of the contents of the grain ensues at the germ end.

4. A process for chemically dehusking grain, comprising simultaneously subjecting the grain to the action of a solvent for dissolving and loosening fatty and waxy substances to facilitate access of the dehusking chemical and to the action of dilute solutions of chemicals capable of strongly dissociating the ions of water, at superatmospheric temperature for a time sufficient to effect dissolving up or dissolving off of husks, and terminating the action of the solution on the grain just before permanent coloration of the contents of the grain ensues at the germ end.

5. A process for chemically dehusking grain, comprising first treating the grain with solvents which dissolve and loosen fatty and waxy substances to facilitate access of the dehusking chemicals, then subjecting the grain to the action of dilute solutions of chemicals which strongly dissociate the ions of water and catalysts which accelerate the action of said chemicals, at superatmospheric temperature for a time sufficient to effect the dissolving up or dissolving off of husks, and terminating the action of the solution on the grain just before permanent coloration of the contents of the grain ensues at the germ end.

6. A process for chemically dehusking grain, comprising subjecting the grain to the action of a dilute solution of solvents which dissolve and loosen fatty and waxy substances to facilitate access of the dehusking chemicals, chemicals which strongly dissociate ions of water and catalysts which accelerate the dehusking action of the chemicals, continuing the treatment at superatmospheric temperature until a dissolving up or dissolving off of husks is effected, and terminating the action of the solution on the grain just before any permanent coloration of the contents of the grain ensues at the germ end.

7. A process for chemically dehusking grain, comprising subjecting the grain to the action of dilute solutions of chemicals capable of strongly dissociating the ions of water and containing a large quantity of salts, at superatmospheric temperature for a time sufficient to effect dissolving up or dissolving off of husks, and terminating the action of the solution on the grain just before permanent coloration of the contents of the grain ensues at the germ end.

8. A process for chemically dehusking grain, comprising subjecting the grain to the action of a dilute solution of chemicals which strongly dissociate ions of water and catalysts which accelerate the action of the chemicals in dissolving up or dissolving off of husks, and containing a large quantity of salts, continuing the treatment at superatmospheric temperature until a dissolving up or dissolving off of husks is effected, and terminating the action of the solution on the grain just before any permanent coloration of the contents of the grain ensues at the germ end.

9. A process for chemically dehusking grain, comprising first treating the grain with a solvent for dissolving and loosening fatty and waxy substances to facilitate access of the dehusking chemical, then subjecting the grain to the action of dilute solutions of chemicals which strongly dissociate the ions of water and containing a large quantity of salts, at superatmospheric temperature for a time sufficient to effect the dissolving up or dissolving off of husks, and terminating the action of the solution on the grain just before permanent coloration of the contents of the grain ensues at the germ end.

10. A process for chemically dehusking grain, comprising simultaneously subjecting the grain to the action of a solvent for dissolving and loosening fatty and waxy substances to facilitate access of the dehusking chemical and to the action of dilute solutions of chemicals capable of strongly dissociating the ions of water and containing a large quantity of salts, at superatmospheric temperature for a time sufficient to effect dissolving up or dissolving off of husks, and terminating the action of the solution on the grain just before permanent coloration of the contents of the grain ensues at the germ end.

11. A process for chemically dehusking grain, comprising first treating the grain with solvents which dissolve and loosen fatty and waxy substances to facilitate access of the dehusking chemicals, then subjecting the grain to the action of dilute solutions of chemicals which strongly dissociate the ions of water and catalysts which accelerate the action of the chemicals in dissolving up or dissolving off of husks, and containing a large quantity of salts, at superatmospheric temperature for a time sufficient to effect the dissolving up or dissolving off of husks, and terminating the action of the solution on the grain just before permanent coloration of the contents of the grain ensues at the germ end.

12. A process for chemically dehusking grain, comprising subjecting the grain to the action of a dilute solution comprising principally solvents which dissolve and loosen fatty and waxy substances to facilitate access of the dehusking chemicals, chemicals which strongly dissociate ions of water, catalysts which accelerate the action of the chemicals in dissolving up or dissolving off of husks, and a large quantity of salts, continuing the treatment at superatmospheric temperature until a dissolving up or dissolving off of husks is effected, and terminating the action of the solution on the grain just before any permanent coloration of the contents of the grain ensues at the germ end.

13. A process for chemically dehusking grain, comprising alternately subjecting the grain to the action of a dilute solution of a strong acid and a dilute solution of a lye, maintaining the grain in contact with the solutions at superatmospheric temperature for a total time sufficient to effect dissolving up or dissolving off of husks, terminating contact of the grain with the final solution just before permanent coloration of the contents of the grain ensues at the germ end, and mixing the waste acid and lye solutions.

14. A process for chemically dehusking grain, comprising subjecting the grain to the action of solutions containing 10 to 50% of chemicals capable of strongly dissociating the ions of water, at superatmospheric temperature for a time sufficient to effect dissolving up or dissolving off of husks, and terminating the action of the solution on the grain just before permanent coloration of the contents of the grain ensues at the germ end.

15. A process for chemically dehusking grain, comprising subjecting the grain to the action of solutions containing 10 to 50% of a dehusking chemical consisting of a substance for strongly dissociating the ions of water, at superatmospheric temperature for a time sufficient to effect dissolving up or dissolving off of husks, and terminating the action of the solution on the grain just before permanent coloration of the contents of the grain ensues at the germ end.

16. A process for chemically dehusking grain, comprising subjecting the grain to the action of solutions containing 20 to 50% of a dehusking chemical consisting of an acid which will strongly dissociate the ions of water, at superatmospheric temperature for a time sufficient to effect dissolving up or dissolving off of husks, and terminating the action of the solution on the grain just before permanent coloration of the contents of the grain ensues at the germ end.

17. A process for chemically dehusking grain, comprising subjecting the grain to the action of solutions containing 10 to 50% of a dehusking chemical consisting of a lye which will strongly dissociate the ions of water, at superatmospheric temperature for a time sufficient to effect dissolving up or dissolving off of husks, and terminating the action of the solution on the grain just before permanent coloration of the contents of the grain ensues at the germ end.

18. A process for chemically dehusking grain, comprising subjecting the grain to the action of a solution containing from 10 to 50% of dehusking chemicals which strongly dissociate the ions of water, at temperatures between 50 to 80° C. for a time sufficient to effect the dissolving up or dissolving off of husks, and terminating the action of the solution on the grain just before permanent coloration of the contents of the grain ensues at the germ end.

19. A process for chemically dehusking grain, comprising subjecting the grain to the action of a solution containing from 20 to 50% of acid reacting dehusking chemicals which strongly dissociate the ions of water, at temperatures between 50 to 80° C. for a time sufficient to effect the dissolving up or dissolving off of husks, and terminating the action of the solution on the grain just before permanent coloration of the contents of the grain ensues at the germ end.

20. A process for chemically dehusking grain, comprising subjecting the grain to the action of a solution containing from 10 to 50% of alkaline reacting dehusking chemicals which strongly dissociate the ions of water, at temperatures between 50 to 80° C. for a time sufficient to effect the dissolving up or dissolving off of husks, and terminating the action of the solution on the grain just before permanent coloration of the contents of the grain ensues at the germ end.

RUDOLF RÜTER.
KURT SEIDEL.